United States Patent
Ranta-Aho et al.

(10) Patent No.: US 10,499,291 B2
(45) Date of Patent: Dec. 3, 2019

(54) MOBILITY MANAGEMENT IN JOINT OPERATION OF RADIO ACCESS TECHNOLOGIES

(71) Applicant: Nokia Solutions and Networks Oy, Espoo (FI)

(72) Inventors: Karri Markus Ranta-Aho, Espoo (FI); Alexander Sayenko, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/541,992

(22) PCT Filed: Jan. 9, 2015

(86) PCT No.: PCT/EP2015/050319
§ 371 (c)(1),
(2) Date: Jul. 6, 2017

(87) PCT Pub. No.: WO2016/110331
PCT Pub. Date: Jul. 14, 2016

(65) Prior Publication Data
US 2018/0007594 A1  Jan. 4, 2018

(51) Int. Cl.
*H04W 36/00* (2009.01)
*H04W 88/06* (2009.01)

(52) U.S. Cl.
CPC ....... *H04W 36/0066* (2013.01); *H04W 88/06* (2013.01)

(58) Field of Classification Search
CPC .... H04W 36/0066; H04W 88/06; H04L 69/18
See application file for complete search history.

(56) References Cited

U.S. PATENT DOCUMENTS

| | | | |
|---|---|---|---|
| 2013/0210442 A1 | 8/2013 | Aoyagi et al. | |
| 2013/0324107 A1* | 12/2013 | Lindoff | H04W 24/10 455/422.1 |
| 2016/0029376 A1* | 1/2016 | Fukuta | H04W 72/0426 370/329 |

FOREIGN PATENT DOCUMENTS

| | | |
|---|---|---|
| WO | 2013/135293 A1 | 9/2013 |
| WO | 2015/002404 A1 | 1/2015 |

OTHER PUBLICATIONS

"Galaxy S5 Download Booster", Samsung Galaxy S5 Guide, Retrieved on Jun. 19, 2017, Webpage available at : http://galaxys5guide.com/samsung-galaxy-s5-features-explained/galaxy-s5-download-booster/.

(Continued)

*Primary Examiner* — Jackie Zuniga Abad
(74) *Attorney, Agent, or Firm* — Brake Hughes Bellermann LLP (57) ABSTRACT

Systems, methods, apparatuses, and computer program products for joint operation of two or more radio access technologies (RATs) is provided. One method includes determining, by a network node of a first radio access technology, that a user equipment is about to connect with a second radio access technology. The method may further include informing the second radio access technology that the connection with the user equipment is a dual-radio access technology connection. The second radio access technology is one of a master or slave radio access technology, and the slave radio access technology has restricted mobility management functionality compared to the master radio access technology.

13 Claims, 5 Drawing Sheets

(56) References Cited

OTHER PUBLICATIONS

International Search Report and Written Opinion received for corresponding Patent Cooperation Treaty Application No. PCT/EP2015/050319, dated Sep. 15, 2015, 12 pages.

"3rd Generation Partnership Project; Technical Specification Group Radio Access Network; RAN Enhancements for UMTS/HSPA and LTE Interworking (Release 12)", 3GPP TR 37.852, V0.3.0, Oct. 2013, pp. 1-29.

\* cited by examiner

MOBILITY MANAGEMENT IN JOINT OPERATION OF RADIO ACCESS TECHNOLOGIES

RELATED APPLICATION

This application was originally filed as PCT Application No. PCT/EP2015/050319 filed Jan. 9, 2015.

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), $5^{th}$ generation (5G) radio access technology, and/or High Speed Packet Access (HSPA).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A is carrier aggregation, which allows for increasing the data rates through aggregation of two or more LTE carriers.

SUMMARY

One embodiment is directed to a method that may include determining, by a network node of a first radio access technology, that a user equipment is about to connect with a second radio access technology, and informing the second radio access technology that the connection with the user equipment is a dual-radio access technology connection. The second radio access technology is one of a master or slave radio access technology, and the slave radio access technology has restricted mobility management functionality compared to the master radio access technology.

Another embodiment is directed to an apparatus which may include at least one processor and at least one memory including computer program code. The apparatus comprises a network node of a first radio access technology, and the at least one memory and computer program code are configured, with the at least one processor, to cause the apparatus at least to determine that a user equipment is about to connect with a second radio access technology, and inform the second radio access technology that the connection with the user equipment is a dual-radio access technology connection. The second radio access technology is one of a master or slave radio access technology, and the slave radio access technology has restricted mobility management functionality compared to the master radio access technology.

Another embodiment is directed to an apparatus which may include determining means for determining, by a network node of a first radio access technology, that a user equipment is about to connect with a second radio access technology. The apparatus may also include informing means for informing the second radio access technology that the connection with the user equipment is a dual-radio access technology connection. The second radio access technology is one of a master or slave radio access technology, and the slave radio access technology has restricted mobility management functionality compared to the master radio access technology.

Another embodiment is directed to a computer-readable medium encoded with instructions that, when executed in hardware, perform a process that may include determining, by a network node of a first radio access technology, that a user equipment is about to connect with a second radio access technology, and informing the second radio access technology that the connection with the user equipment is a dual-radio access technology connection. The second radio access technology is one of a master or slave radio access technology, and the slave radio access technology has restricted mobility management functionality compared to the master radio access technology.

Another embodiment is directed to a method that may include determining, by a user equipment connected to a first radio access technology, that the user equipment is able to initiate access to a second radio access technology. The method may also include receiving a message informing the user equipment that a connection with the second radio access technology is a dual-radio access technology connection. The second radio access technology is one of a master radio access technology or a slave radio access technology, and the slave radio access technology has restricted mobility management functionality compared to the master radio access technology.

Another embodiment is directed to an apparatus which may include at least one processor and at least one memory including computer program code. The at least one memory and computer program code are configured, with the at least one processor, to cause the apparatus at least to determine, by the apparatus which is connected to a first radio access technology, that the apparatus is able to initiate access to a second radio access technology, and receive a message informing the apparatus that a connection with the second radio access technology is a dual-radio access technology connection. The second radio access technology is one of a master radio access technology or a slave radio access technology, and the slave radio access technology has restricted mobility management functionality compared to the master radio access technology.

Another embodiment is directed to an apparatus which may include determining means for determining, by the apparatus connected to a first radio access technology, that the apparatus is able to initiate access to a second radio access technology. The apparatus may also include receiving means for receiving a message informing the apparatus that a connection with the second radio access technology is a dual-radio access technology connection. The second radio access technology is one of a master radio access technology or a slave radio access technology, and the slave radio access technology has restricted mobility management functionality compared to the master radio access technology.

Another embodiment is directed to a computer-readable medium encoded with instructions that, when executed in hardware, perform a process that may include determining, by a user equipment connected to a first radio access technology, that the user equipment is able to initiate access to a second radio access technology. The method may also include receiving a message informing the user equipment that a connection with the second radio access technology is a dual-radio access technology connection. The second radio access technology is one of a master radio access technology or a slave radio access technology, and the slave radio access technology has restricted mobility management functionality compared to the master radio access technology.

Another embodiment is directed to a method that may include detecting, by a network node of a second radio access technology, that a user equipment, which is already connected to a first radio access technology, is also connecting with the second radio access technology. The method may also include receiving an indication, from the user equipment or the first radio access technology, that the connection with the user equipment is a dual-radio access technology connection. The second radio access technology is one of a master or slave radio access technology, and the slave radio access technology has restricted mobility management functionality compared to the master radio access technology.

Another embodiment is directed to an apparatus which may include at least one processor and at least one memory including computer program code. The apparatus comprises a network node of a second radio access technology, and the at least one memory and computer program code are configured, with the at least one processor, to cause the apparatus at least to detect that a user equipment, which is already connected to a first radio access technology, is also connecting with the second radio access technology, and to receive an indication, from the user equipment or the first radio access technology, that the connection with the user equipment is a dual-radio access technology connection. The second radio access technology is one of a master or slave radio access technology, and the slave radio access technology has restricted mobility management functionality compared to the master radio access technology.

Another embodiment is directed to an apparatus which may include detecting means for detecting, by a network node of a second radio access technology, that a user equipment, which is already connected to a first radio access technology, is also connecting with the second radio access technology. The apparatus may also include receiving means for receiving an indication, from the user equipment or the first radio access technology, that the connection with the user equipment is a dual-radio access technology connection. The second radio access technology is one of a master or slave radio access technology, and the slave radio access technology has restricted mobility management functionality compared to the master radio access technology.

Another embodiment is directed to a computer-readable medium encoded with instructions that, when executed in hardware, perform a process that may include detecting, by a network node of a second radio access technology, that a user equipment, which is already connected to a first radio access technology, is also connecting with the second radio access technology. The method may also include receiving an indication, from the user equipment or the first radio access technology, that the connection with the user equipment is a dual-radio access technology connection. The second radio access technology is one of a master or slave radio access technology, and the slave radio access technology has restricted mobility management functionality compared to the master radio access technology.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for joint operation of two or more radio access technologies, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Recent advances in the field of wireless communication include the ability of current mobile terminals, referred to as user equipment (UE), to support multiple radio access technologies (RAT). Depending on the internal design and implementation, certain UE types can work simultaneously and independently with more than one particular RAT. In turn, there are operators that deploy and run different combination of RATs (e.g., GSM+HSPA+LTE, CDMA+LTE, GSM+LTE, 5G+LTE/CDMA/HSPA/GSM). Such an ecosystem provides motivation and an initial basis for looking into possibilities of organizing radio access in such a way that a UE may obtain access and remain connected to several RATs simultaneously in a similar fashion already possible with cellular access and Wi-Fi. One of the advantages of such an approach is that it allows a UE to obtain access to the radio spectrum from different technologies and therefore noticeably boost achievable data rates and best utilize the available capacity across the technologies. In turn, it poses some challenges and new requirements regarding how such a UE should be handled by the core access network.

Therefore, according to certain embodiments, a UE is capable of obtaining simultaneous access to multiple RATs, such that the UE can function as a full-featured device from the viewpoint of each of the involved RATs. This means that each RAT, and more precisely the network node in charge of the Radio Resource Management (RRM) for each RAT (e.g., the base station, eNB in LTE, or the RNC in the UMTS/HSPA system), can control independently the basic radio resource management (RRM) functions, such as scheduling, certain feature activation/de-activation, secondary carrier configuration, etc.

One of the intrinsic RRM functions, which every RAT performs, is mobility management where each RAT decides when a UE should be served by a different cell, by a different frequency layer, and/or by another RAT, due to the mobility of the UE, traffic characteristics, or the operator's RAT prioritization policy, for example. With regards to the movement to another RAT, in an embodiment, a UE configured with several RATs may logically be anchored only to one of them; otherwise each RAT could potentially issue controversial mobility commands even asking a UE to move to a RAT, which a UE is already configured with. Therefore, embodiments provide the notion of a so-called "master mobility RAT" or "mobility anchor RAT", which is in charge of all of the major inter-RAT decisions, as opposed to a "slave mobility RAT" that has restricted its mobility RRM functions.

Figure 1A:
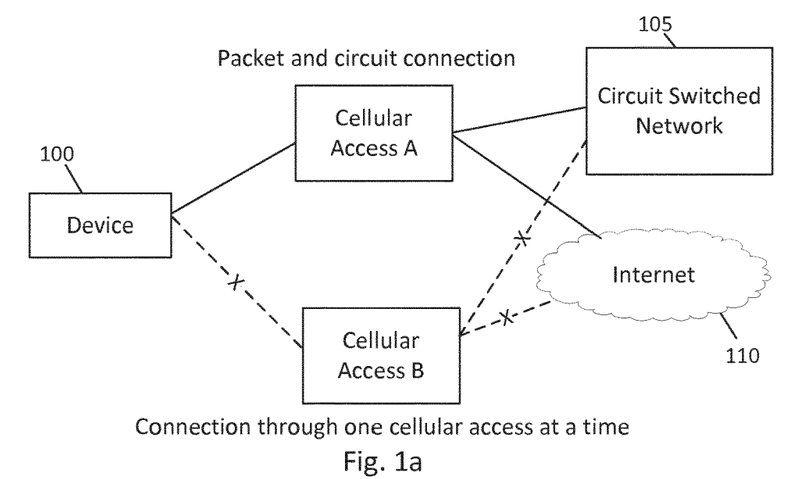
FIG. 1a illustrates a block diagram of a system, according to an embodiment.

FIG. 1a illustrates an example system in which a mobile device 100 is capable of connecting to one type of cellular access network at a time. In the example of FIG. 1a, mobile device 100 is capable of connecting either to cellular access technology A or to cellular access technology B in order to communicate over circuit switched network 105 or the internet 110. For example, cellular access technology A may be UMTS and cellular access technology B may be GSM, or vice versa.

Figure 1B:
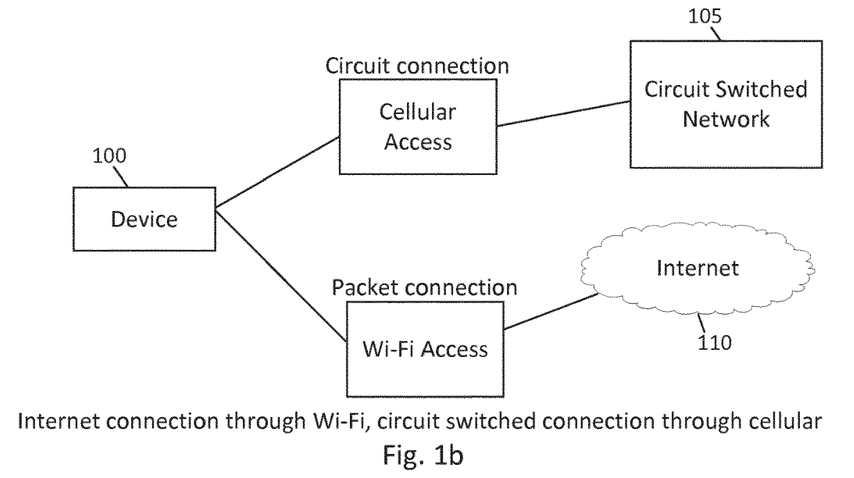
FIG. 1b illustrates a block diagram of a system, according to an embodiment.

Mobile devices, such as a UE, may be equipped with cellular and Wi-Fi connectivity thereby making them capable of operating simultaneously in a single cellular access technology and Wi-Fi access technology. One setup is such that when the device is connected to Wi-Fi, packet data connections are relayed over Wi-Fi radio and the cellular radio takes care of circuit switched access. An example of this configuration is illustrated in FIG. 1b, where mobile device 100 is capable of connecting to cellular access in order to communicate over circuit switched network 105, and is capable of connecting to Wi-Fi access in order to communicate over the internet 110.

Figure 1C:
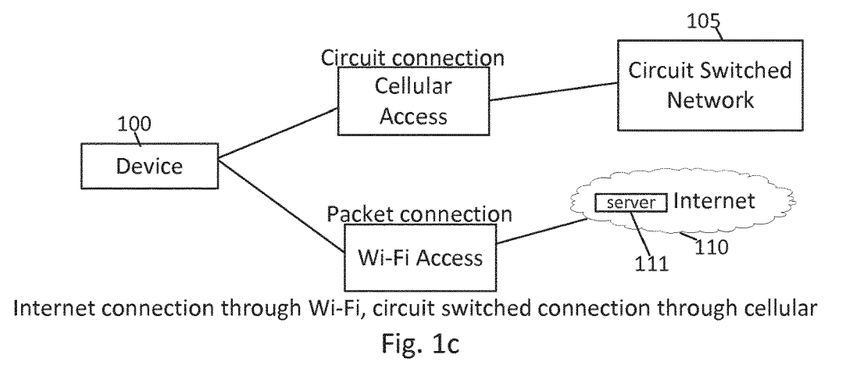
FIG. 1c illustrates a block diagram of a system, according to an embodiment.

FIG. 1c illustrates yet another configuration of a system that allows for downloading, to device 100, different parts of the same file over Wi-Fi and cellular access simultaneously, effectively summing the cellular access and Wi-Fi download speeds. In this example, a server 111 splits the download stream in two.

Embodiments of the invention support the transmitting of parallel data streams over two different cellular radio access technologies (RATs). For example, in an embodiment, there may be one data path over UMTS and another over LTE, or in the future, LTE and 5G, or different 5G technologies, such as 5G wide area and 5G small cell technologies. These are only some examples of the applicable RATs, and it should be noted that embodiments may support the transmission of data streams over any two different RATs.

In view of the above, an embodiment provides a "master/slave mobility RAT" arrangement. In particular, in one embodiment, the current RAT decides whether it will be a master RAT or a slave RAT and informs the other RAT about it (over X2, S1 or air-interface, for example). The slave RAT restricts its inter-RAT handover RRM functionality in such a way that it can only move a UE between different cells and frequency layers within that RAT, but does not move a UE to a different RAT. In other words, the slave RAT is restricted to intra-RAT mobility management. In an embodiment, if a UE moves out of coverage of the slave RAT, the slave RAT can only release the connection and the master RAT may be informed about the connection release, but the slave RAT does not initiate inter-RAT handover. In one embodiment, the slave RAT receives the indication to restrict the mobility management from the master RAT. In one embodiment, the slave RAT (e.g., the base station serving the slave RAT) knows that it is to restrict the mobility management simply from receiving the indication that it is to serve as a slave RAT from the point of view of mobility management. The details on how to restrict the mobility management may be thus indicated by the master RAT (directly or via the connecting UE) or pre-coded to the base station of the slave RAT.

Meanwhile, the master RAT remains in charge of inter-RAT handover. If a UE goes out of coverage of the current master RAT, the current master RAT may inform the slave RAT that its role is changing from slave to master upon releasing the corresponding RRC connection, and also inform the UE to release the connection to the current RAT. The master RAT may decide to terminate the slave RAT RRC connection if it is required, for instance, for mobility purposes. As an example, HSPA+LTE operation may be re-configured to pure GSM. Therefore, according to certain embodiments, the master RAT is in charge of inter-RAT mobility management decisions (e.g., handovers).

One embodiment is directed to performing the signalling via the UE. In this embodiment, the current RAT (the RAT to which the UE is initially connected to) decides to initiate a dual-RAT connection by adding another RAT to the UE. There may be several scenarios under which the current RAT is aware that the UE is the coverage area of another RAT. For example, the UE may be requested to perform inter-RAT measurements and/or the current RAT may know that another RAT is served from the same cell tower or antenna with comparable coverage, for example. In any case, in this embodiment, the current RAT signals the UE (e.g., over RRC layer) the information that it is to initiate access to another RAT. In one embodiment, this may be done with an extension to inter-system handover signalling, where the existing inter-system handover signalling is used to provide the UE with the information of the target RAT, but the connection to the existing RAT is not released, and the said extension informs the UE to maintain the connection to the current RAT and that one of the two RATs is to be a master RAT and the other one is to be the slave RAT. In an embodiment, the current RAT may indicate to the UE that it is allowed to setup access to the other RAT if certain criteria are met (e.g., data volume needs).

According to an embodiment, the UE initiates access to the new RAT while maintaining the connection to the original current RAT. In one embodiment, the act of initiating access to the new RAT may be at the discretion of the UE, for example when the above-mentioned certain criteria are met. During the access procedure, the UE informs the new RAT that the connection is for dual-RAT, and informs the new RAT whether it is to be the master or the slave. A success (or failure) of the addition of the new RAT is provided to the original current RAT. As mentioned above, the RAT that was designated as the slave RAT will not perform inter-RAT mobility, but otherwise the two RATs do not need to act any differently from a normal single-RAT operation, i.e., the RATs may operate independently.

In another embodiment, rather than performing the signalling via the UE, the current RAT may negotiate with the new RAT that it is to initiate a dual-RAT operation and which of the two RATs is to be the master RAT and which is to be the slave RAT. After the negotiation is successful, the current RAT may provide the UE with a message to initiate a connection to the new RAT while maintaining the connection to the current RAT.

Figure 2A:
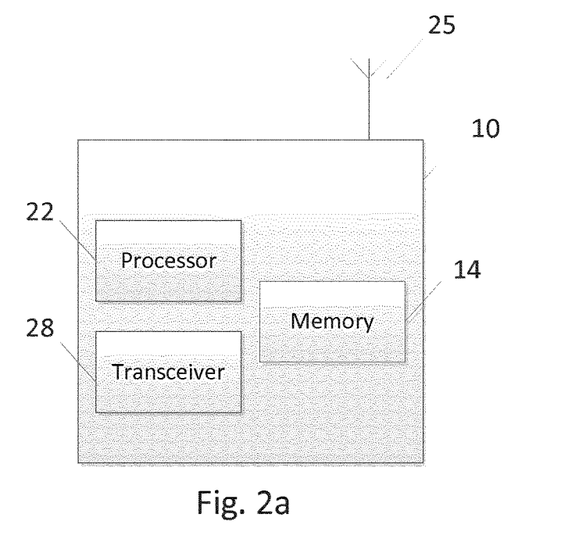
FIG. 2a illustrates a block diagram of an apparatus, according to one embodiment.

FIG. 2a illustrates an example of an apparatus 10 according to an embodiment. In an embodiment, apparatus 10 may be a node, host, or server in a communications network or serving such a network. For example, apparatus 10 may be a network node or access node for a radio access network, such as a base station in UMTS/GSM or eNB in LTE or LTE-A, or an access node of 5G radio access technology. It should be noted that one of ordinary skill in the art would understand that apparatus 10 may include components or features not shown in FIG. 2a.

As illustrated in FIG. 2a, apparatus 10 includes a processor 22 for processing information and executing instructions or operations. Processor 22 may be any type of general or specific purpose processor. While a single processor 22 is shown in FIG. 2a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UMTS/GSM or an eNB in LTE or LTE-A, or an access node of 5G, for example. According to one embodiment, apparatus 10 may be a network node (e.g., base station or eNB) of a first RAT. In one embodiment, apparatus 10 may be controlled by memory 14 and processor 22 to determine that a user equipment may be about to connect with a second RAT. For example, in one embodiment, apparatus 10 may be controlled by memory 14 and processor 22 to configure the user equipment to connect with the second RAT, to decide whether the second RAT will be a master RAT or a slave RAT, and to inform the second RAT that its connection with the user equipment is a dual-RAT connection. In an embodiment, the second RAT may be further informed about the decision as to whether the second RAT is a master or slave RAT. For example, the first RAT or second RAT may be UMTS/GSM, HSPA, CDMA, LTE, or 5G. According to certain embodiments, the first RAT is different from the second RAT. For instance, if the first RAT is LTE, then the second RAT may be HSPA, or vice versa. Of course other combinations are also possible according to embodiments of the invention.

According to one embodiment, when apparatus 10 determines that the user equipment is about to connect to the second RAT, apparatus 10 may be controlled by memory 14 and processor 22 to signal to the user equipment that it is to initiate access to the second RAT. For example, in an embodiment, apparatus 10 may signal to the user equipment that it is to initiate access to the second RAT by providing the user equipment with the information for initiating access to the second RAT, while maintaining the connection to the first RAT, and informing the user equipment that one of the first and second RAT is to be the master RAT and the other one is to be the slave RAT. In an embodiment, the information may be provided to the user equipment through an extension to inter-system handover signalling.

In another embodiment, when apparatus 10 determines that the user equipment is about to connect to the second RAT, apparatus 10 may be controlled by memory 14 and processor 22 to negotiate with the second RAT that it is to perform a dual-RAT operation and which of the first and second RATs are to be the master RAT and which is to be the slave RAT. In this embodiment, apparatus 10 may be further controlled by memory 14 and processor 22 to provide the user equipment with a message to initiate a connection to the second RAT.

In an embodiment, the first RAT may be the master RAT and the second RAT may be the slave RAT. In other embodiments, the first RAT may be the slave RAT and the second RAT may be the master RAT.

According to certain embodiments, the slave RAT has restricted inter-RAT mobility management functionality such that the slave radio access technology can only move the user equipment within the slave radio access technology. In contrast, the master RAT may be in control of inter-radio access technology mobility management decisions (e.g., handovers).

According to an embodiment, apparatus 10 may be controlled by memory 14 and processor 22 to receive an indication from the second RAT when the UE moves out of a coverage area of the second RAT. In some embodiments, when the user equipment loses connection and/or moves out of a coverage area of the first radio technology, apparatus 10 may be controlled by memory 14 and processor 22 to inform the second RAT that its role is changing from a slave RAT to a master RAT, and in certain instances to release a connection with the UE. In an embodiment, apparatus 10 may be further controlled by memory 14 and processor 22 to decide to terminate a slave RAT connection to the user equipment upon detecting that a predetermined criterion is met (e.g. traffic load drops under a predefined threshold, mobility of the UE) and/or to decide to terminate a slave RAT radio resource control (RRC) when required for mobility purposes.

In another embodiment apparatus 10 may be a network node (e.g., base station or eNB) of a second RAT. In this embodiment, apparatus 10 may be controlled by memory 14 and processor 22 to detect that a user equipment, which is already connected to a first RAT, is also connecting with the second RAT, and to receive an indication, from the user equipment or the first RAT, that the connection with the user equipment is a dual-RAT connection. In an embodiment, the second RAT is one of a master RAT or slave RAT, where the slave RAT has restricted mobility management functionality compared to the master RAT. According to one embodiment, when the second RAT is the slave RAT, apparatus 10 may be controlled by memory 14 and processor 22 to restrict the mobility management functionality such that the second RAT can only move the user equipment within the second RAT. In an embodiment, apparatus 10 may also be controlled by memory 14 and processor 22 to receive an indication according to which the second RAT is to switch its role from the slave RAT to the master RAT, or vice versa.

Figure 2B:
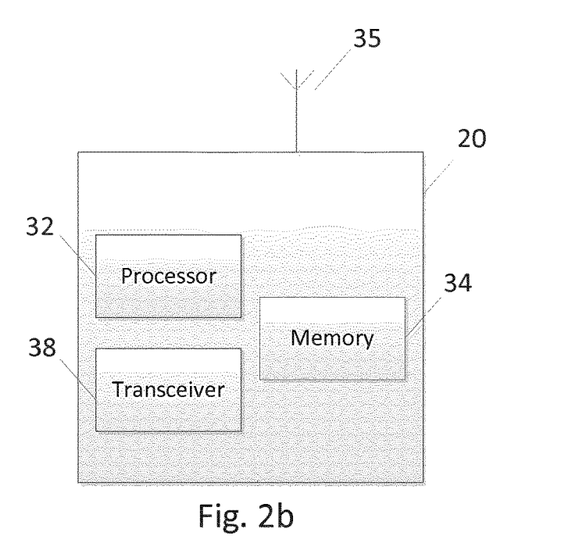
FIG. 2b illustrates a block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile device, mobile unit, or other device. For instance, in some embodiments, apparatus 20 may be UE in LTE, LTE-A, or 5G. It should be noted that one of ordinary skill in the art would understand that apparatus 20 may include components or features not shown in FIG. 2b.

As illustrated in FIG. 2b, apparatus 20 includes a processor 32 for processing information and executing instructions or operations. Processor 32 may be any type of general or specific purpose processor. While a single processor 32 is shown in FIG. 2b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE, LTE-A, or 5G. In this embodiment, apparatus 20 may be controlled by memory 34 and processor 32 to determine that the apparatus 20 is able to initiate access to a second RAT, and to receive a message informing the apparatus 20 that a connection with the second RAT is a dual-RAT connection, where the second RAT is one of a master RAT or a slave RAT. As discussed above, the slave RAT has restricted inter-RAT handover RRM functionality such that the slave RAT can only move the apparatus 20 between different cells and frequency layers within the slave RAT.

In one embodiment, apparatus 20 may be controlled by memory 34 and processor 32 to receive an indication from the first RAT that the apparatus 20 is allowed to setup access to the second RAT when certain criteria are met. According to certain embodiments, apparatus 20 may be controlled by memory 34 and processor 32 to initiate a connection to the second RAT at the discretion of the apparatus 20, while maintaining a connection to the first radio access technology. In one embodiment, apparatus 20 may be further controlled by memory 34 and processor 32 to inform the second RAT that the connection is for dual-RAT and whether the second RAT is a master or slave RAT, and to provide to the first RAT an indication of success or failure of the connection to the second RAT.

Figure 3A:
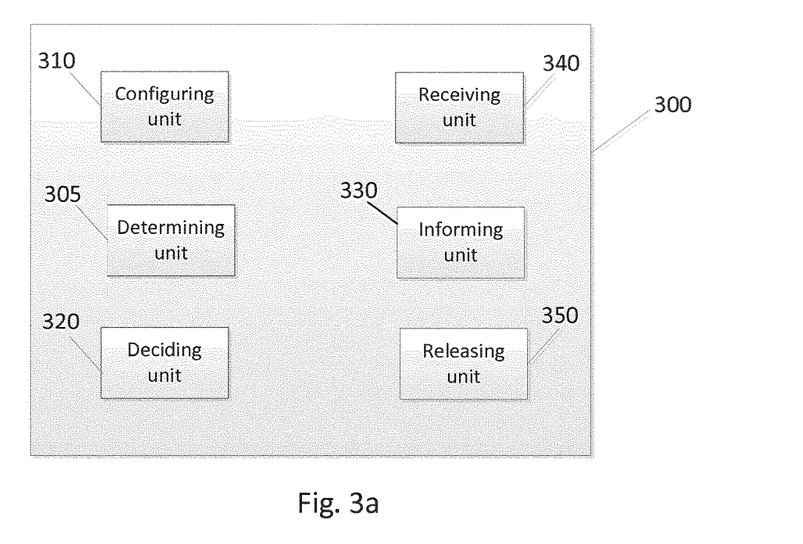
FIG. 3a illustrates a block diagram of an apparatus, according to one embodiment.

FIG. 3a illustrates a block diagram of an apparatus 300, according to another embodiment of the invention. Apparatus 300 may be a node, host, or server in a communications network or serving such a network. For example, apparatus 300 may be a network node or access node for a radio access network, such as a base station in UMTS/GSM, eNB in LTE or LTE-A, or access node in 5G.

In the example of FIG. 3a, apparatus 300 may be a network node of a first RAT. As illustrated in FIG. 3a, apparatus 300 may include a determining unit or means 305 for determining that a user equipment may be about to connect with a second radio access technology. Apparatus 300 may also include an informing unit or means 330 for informing the second RAT that the connection with the user equipment is a dual-RAT connection. The second RAT may be one of a master or slave RAT, and the slave RAT has restricted mobility management functionality compared to the master RAT. In one embodiment, apparatus 300 may also include a configuring unit or means 310 for configuring a UE to connect with the second RAT. In an embodiment, configuring unit or means 310 may be a processor or controller, for example. Apparatus 300 may also include a deciding unit or means 320 for deciding whether the second RAT will be a master RAT or a slave RAT. In an embodiment, deciding unit or means 320 may be a processor or controller, for example.

In one embodiment, the informing unit or means 330 may also inform the second radio access technology about the decision as to whether the second radio access technology is a master or slave radio access technology. In an embodiment, informing unit or means 330 may be a transmitter, for example. As discussed above, the slave RAT has restricted inter-RAT handover RRM functionality such that the slave RAT can only move the UE within the slave RAT, e.g. between different cells and frequency layers within the slave RAT; while the master RAT is in control of inter-radio access technology mobility management decisions.

Apparatus 300 may also include a receiving unit or means 340 for receiving an indication from the second RAT when the UE moves out of a coverage area of the second RAT. In an embodiment, receiving unit or means 340 may be a receiver or transceiver, for example. Further, in one embodiment, when the UE moves out of a coverage area of the first RAT, the informing unit or means 330 may inform the second RAT that its role is changing from a slave RAT to a master RAT. In an embodiment, apparatus 300 may also include a releasing unit or means 350 for releasing a connection with the user equipment. According to one embodiment, deciding unit or means 320 may decide to terminate the slave RAT RRC when required for mobility purposes.

Figure 3B:
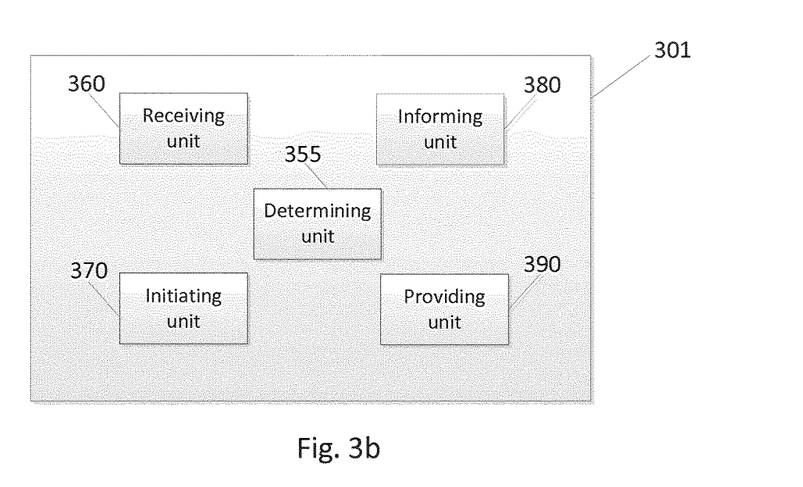
FIG. 3b illustrates a block diagram of an apparatus, according to another embodiment.

FIG. 3b illustrates a block diagram of an apparatus 301, according to another embodiment of the invention. Apparatus 301 may be a mobile device, such as a UE in LTE, LTE-A, or 5G. In an embodiment, apparatus 301 may be connected to a first RAT and may include a determining unit or means 355 for determining that apparatus 301 is able to connect to a second RAT. Apparatus 301 may further include a receiving unit or means 360 for receiving a message informing apparatus 301 that the connection with the second RAT is a dual-RAT connection, where the second RAT is one of a master RAT or slave RAT. In one embodiment, the receiving unit or means 306 may also receive a message from the first RAT indicating that the apparatus 301 is allowed to setup access to the second RAT when certain criteria are met. As outlined above, the slave RAT has restricted inter-RAT handover RRM functionality such that the slave RAT can only move the UE between different cells and frequency layers within the slave RAT.

In an embodiment, the message received from the first RAT may include an indication that the apparatus 301 is allowed to setup access to the second RAT when certain criteria are met. In certain embodiments, apparatus 301 may also include an initiating unit or means 370 for initiating a connection to the second RAT at the discretion of the apparatus 301, while maintaining a connection to the first RAT. According to one embodiment, apparatus 301 may further include an informing unit or means 380 for informing the second RAT that the connection is for dual-RAT and whether the second RAT is a master or slave RAT. In an embodiment, apparatus 301 may also include a providing unit or means 390 for providing to the first RAT an indication of success or failure of the connection to the second RAT.

Figure 3C:
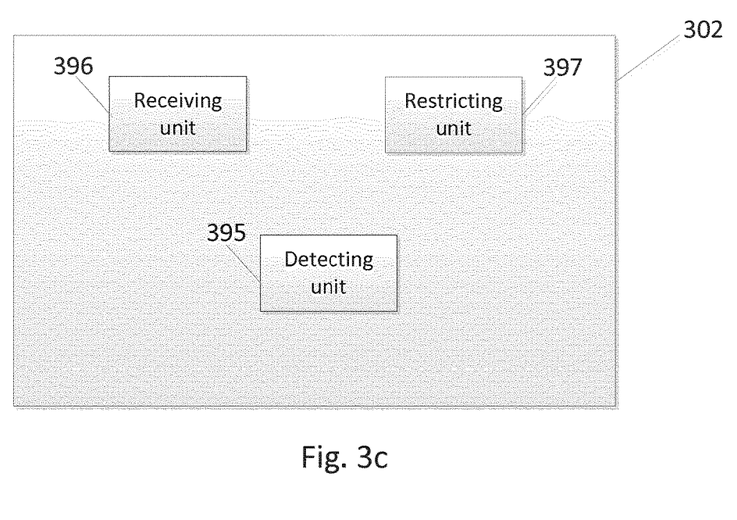
FIG. 3c illustrates a block diagram of an apparatus, according to another embodiment.

FIG. 3c illustrates a block diagram of an apparatus 302, according to another embodiment of the invention. Apparatus 302 may be a node, host, or server in a communications network or serving such a network. For example, apparatus 302 may be a network node or access node for a radio access network, such as a base station in UMTS/GSM, eNB in LTE or LTE-A, or access node in 5G. In the example of FIG. 3c, apparatus 302 may be a network node of a second RAT. As illustrated in FIG. 3c, apparatus 300 may include a detecting unit or means 395 for detecting that a user equipment, which is already connected to a first RAT, is also connecting with the second RAT, and a receiving unit or means 396 for receiving an indication, from the user equipment or the first RAT, that the connection with the UE is a dual-RAT connection. In an embodiment, the second RAT is one of a master RAT or slave RAT, where the slave RAT has restricted mobility management functionality compared to the master RAT.

In an embodiment, when apparatus 302 is the slave RAT, the apparatus 302 may further include a restricting unit or means 397 for restricting the mobility management functionality such that the second RAT can only move the user equipment within the second RAT. According to one embodiment, the receiving unit or means 396 may further receive an indication according to which the second RAT is to switch its role from the slave RAT to the master RAT, or vice versa.

Figure 4A:
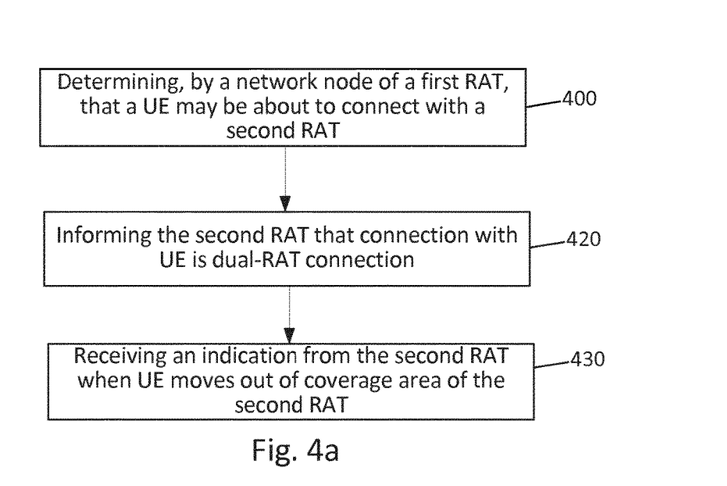
FIG. 4a illustrates a flow diagram of a method, according to an embodiment.

FIG. 4a illustrates an example flow diagram of a method according to one embodiment. In an embodiment, the method of FIG. 4a may be executed by a network node or access node, such as a base station or eNB. As illustrated in FIG. 4a, the method may include, at 400, determining, by a network node of a first RAT, that a user equipment may be about to connect to a second RAT. In certain embodiments, the determining step may further include configuring, by the network node of the first RAT, a UE to connect with the second RAT. In some embodiments, the method may further include deciding whether the second RAT will be a master RAT or a slave RAT. In other embodiments, however, the first RAT is the master RAT and the second RAT is the slave RAT (e.g., the LTE network is always the master RAT and the UMTS is always the slave RAT). In one embodiment, the RAT with a higher theoretical throughput capability is always the master and the other one is the slave RAT. For example, 5G RAT may be the master and the LTE or UMTS the slave RAT. In one embodiment, the method may also include, at 420, informing the second RAT that the connection with the user equipment is a dual-RAT connection and/or, optionally, informing the second RAT about the decision as to whether the second RAT is a master or slave RAT. For instance, in embodiments where it is already known that the first RAT is the master RAT and the second RAT is the slave RAT, the second RAT may just be informed of the dual-RAT connection and that the second RAT should restrict inter-RAT mobility.

In some embodiments, the determining step may further include signalling, by the network node of the first radio access technology, the user equipment that it is to initiate access to the second radio access technology. The signalling may include providing the user equipment with the information for initiating access to the second RAT, while maintaining the connection to the first RAT, and informing the user equipment that one of the first and second RAT is to be the master RAT and the other one is to be the slave RAT.

According to certain embodiments, the determining step may also include negotiating with the second RAT that it is to perform a dual-RAT operation and which of the first and second RATs are to be the master RAT and which is to be the slave RAT, and providing the user equipment with a message to initiate a connection to the second RAT.

In an embodiment, the method may further include, at 430, receiving, by the network node of the first RAT, an indication from the second RAT when the UE moves out of a coverage area of the second RAT.

In certain embodiments, when the user equipment loses connection and/or moves out of a coverage area of the first RAT, the method may further include informing the second RAT that its role is changing from a slave RAT to a master RAT, and releasing a connection with the UE. In one embodiment, the method may further include deciding to terminate a slave RAT radio resource control when required for mobility or other purposes, such as upon detecting that a predetermined criterion is met.

Figure 4B:
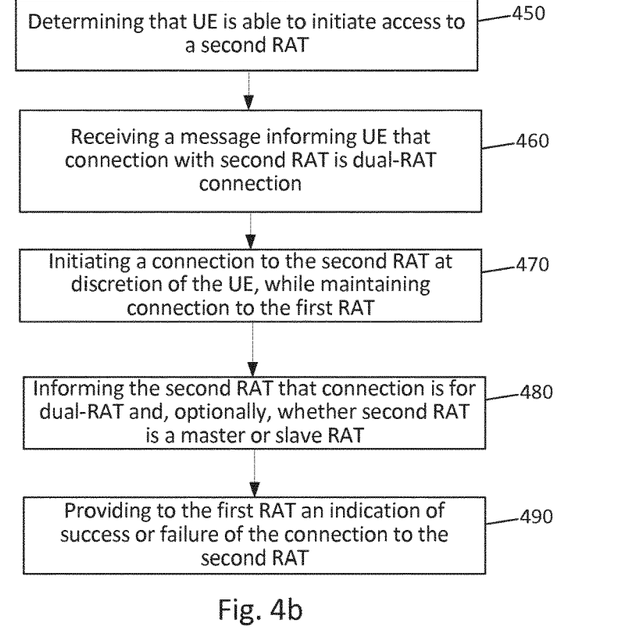
FIG. 4b illustrates a flow diagram of a method, according to another embodiment.

FIG. 4b illustrates an example flow diagram of a method according to another embodiment. In an embodiment, the method of FIG. 4b may be executed by a mobile device, such as a UE, or by a modem or a chip inside the mobile device. As illustrated in FIG. 4b, the method may include, at 450, determining that the UE is able to initiate access to a second RAT. The method may further include, at 460, receiving a message informing the user equipment that the connection with the second RAT is a dual-RAT connection, where the second RAT is one of a master RAT or a slave RAT. As discussed above, in certain embodiments, the slave RAT has restricted mobility management functionality such that the slave RAT can only move the UE between different cells and frequency layers within the slave RAT.

In certain embodiments, the determining step may further include determining that the user equipment is able to initiate access to the second RAT based on a message received from the first RAT indicating that the user equipment is able to initiate access to the second RAT. In one embodiment, the message received from the first RAT includes an indication that the user equipment is allowed to setup access to the second radio access technology when certain criteria are met. Returning to FIG. 4b, the method may further include, at 470, initiating a connection to the second RAT at the discretion of the UE, while maintaining a connection to the first RAT. In this example, the phrase "at the discretion of the UE" refers to the fact that the UE needs to setup the connection either immediately, or potentially if some defined criteria (e.g. related to load, for example) are met, but not just based on the UE's free will. The method may also include, at 480, informing the second RAT that the connection is for dual-RAT and, optionally, whether the second RAT is a master or slave RAT. The method may then include, at 490, providing to the first RAT an indication of success or failure of the connection to the second RAT.

Figure 4C:
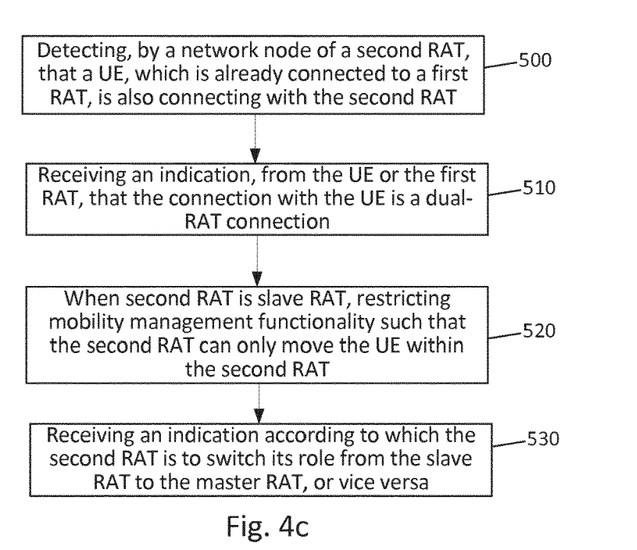
FIG. 4c illustrates a flow diagram of a method, according to another embodiment.

FIG. 4c illustrates an example flow diagram of a method according to one embodiment. In an embodiment, the method of FIG. 4c may be executed by a network node or access node, such as a base station or eNB. As illustrated in FIG. 4c, the method may include, at 500, detecting, by a network node of a second RAT, that a user equipment, which is already connected to a first RAT, is also connecting with the second RAT. The method may also include, at 510, receiving an indication, from the user equipment or the first RAT, that the connection with the UE is a dual-RAT connection. In an embodiment, the second RAT may be one of a master RAT or slave RAT, where the slave RAT has restricted mobility management functionality compared to the master radio access technology.

In some embodiments, the method of FIG. 4c may further include, at 520, when the second RAT is the slave RAT, the network node of the second RAT restricting its mobility management functionality such that the second RAT can only move the user equipment within the second radio access technology. The method may also include, at 530, receiving an indication according to which the second RAT is to switch its role from being the slave RAT to the master RAT, or vice versa.

In some embodiments, the functionality of any of the methods described herein, such as those illustrated in FIG. 4a, 4b, or 4c discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

In an embodiment at least some of the functionalities of the apparatuses shown in the Figures may be shared between two physically separate devices forming one operational entity. Therefore, the apparatuses may be seen to depict the first operational entity comprising one or more physically separate devices for executing at least some of the described processes. Such shared architecture, may comprise a remote control unit (RCU), such as a host computer or a server computer, operatively coupled (e.g. via a wireless or wired network) to a remote radio head (RRH) located in the base station or eNB, for example. In an embodiment, at least some of the described processes may be performed by the RCU. In an embodiment, the execution of at least some of the described processes may be shared among the RRH and the RCU. In practice, any digital signal processing task may be performed in either the RRH or the RCU and the boundary where the responsibility is shifted between the RRH and the RCU may be selected according to implementation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   wherein the apparatus comprises or is comprised in a network node of a first radio access technology, and
   wherein the at least one memory and computer program code are configured, with the at least one processor, to cause the apparatus at least to:
   determine that a user equipment already connected to the first radio access technology is about to connect with a second radio access technology while maintaining connection with the first radio access technology, wherein the first and second radio access technologies are different cellular radio access technologies; and
   inform the second radio access technology that the connection with the user equipment will be a dual radio access technology connection, and that the second radio access technology is one of a master or slave radio access technology for the connection, wherein the slave radio access technology has restricted mobility management functionality compared to the master radio access technology such that the master radio access technology is in control of the inter-radio access technology mobility of the user equipment technology and in control of mobility of the user equipment within the master radio access technology and the slave radio access technology controls mobility of the user equipment only within the slave radio access technology, such that the slave radio access technology controls user equipment handovers only between cells of the slave radio access technology.

2. The apparatus according to claim 1, wherein the at least one memory and computer program code are configured, with the at least one processor, to cause the apparatus further to:
   decide whether the second radio access technology will be the master radio access technology or the slave radio access technology.

3. The apparatus according to claim 1, wherein the first radio access technology is the master radio access technology, and wherein the second radio access technology is the slave radio access technology.

4. The apparatus according to claim 1, wherein the at least one memory and computer program code are configured, with the at least one processor, to cause the apparatus further to:
   receive an indication from the second radio access technology when the user equipment moves out of a coverage area of the second radio access technology.

5. The apparatus according to claim 1, wherein the at least one memory and computer program code are configured, with the at least one processor, to cause the apparatus further to:
   inform, when the user equipment loses a connection to the first radio access technology, the second radio access technology that the role of the second radio access technology is changing from the slave radio access technology to the master radio access technology.

6. The apparatus according to claim 1, wherein the at least one memory and computer program code are configured, with the at least one processor, to cause the apparatus further to:
   decide to terminate the slave radio access technology connection to the user equipment upon detecting that a predetermined criterion is met.

7. The apparatus according to claim 1, wherein the at least one memory and computer program code are configured, with the at least one processor, to cause the apparatus further to:
   signal the user equipment that it is to initiate access to the second radio access technology wherein the signalling provides the user equipment with information for initiating access to the second radio access technology while maintaining connection to the first radio access technology, wherein the signaling informs the user equipment that one of the first and second radio access technology is to be the master radio access technology and the other one is to be the slave radio access technology.

8. The apparatus according to claim 1, wherein the at least one memory and computer program code are configured, with the at least one processor, to cause the apparatus further to:
   negotiate with the second radio access technology that it is to perform a dual-radio access technology operation and which of the first and second radio access technologies are to be the master radio access technology and which is to be the slave radio access technology; and
   provide the user equipment with a message to initiate a connection to the second radio access technology.

9. An apparatus, comprising:
   at least one processor; and
   at least one memory including computer program code,
   wherein the apparatus comprises or is comprised in a user equipment, and wherein the at least one memory and computer program code are configured, with the at least one processor, to cause the apparatus at least to:

determine that the user equipment which is already connected to a first radio access technology is able to initiate access to a second radio access technology, wherein the first and second radio access technologies are different cellular radio access technologies;

receive a message informing the user equipment that a connection with the second radio access technology will be a dual-radio access technology connection, and that the second radio access technology is one of a master radio access technology or a slave radio access technology for the connection, wherein the slave radio access technology has restricted mobility management functionality compared to the master radio access technology such that the master radio access technology is in control of the inter-radio access technology mobility of the user equipment and in control of mobility of the user equipment within the master radio access technology and the slave radio access technology controls mobility of the user equipment only within the slave radio access technology, such that the slave radio access technology controls user equipment handovers only between cells of the slave radio access technology; and connect with the second radio access technology while maintaining connection with the first radio access technology, wherein the connection is for dual-radio access technology and the second radio access technology is the master or slave radio access technology.

10. The apparatus according to claim 9, wherein the at least one memory and computer program code are configured, with the at least one processor, to cause the apparatus further to:

receive an indication from the first radio access technology indicating that the user equipment is allowed to setup access to the second radio access technology when certain criteria are met.

11. The apparatus according to claim 9, wherein the at least one memory and computer program code are configured, with the at least one processor, to cause the apparatus further to:

initiate the connection to the second radio access technology at a discretion of the user equipment; and provide to the first radio access technology an indication of the connection to the second radio access technology.

12. An apparatus, comprising:

at least one processor; and at least one memory including computer program code, wherein the apparatus comprises or is comprised in a network node of a second radio access technology, wherein the at least one memory and computer program code are configured, with the at least one processor, to cause the apparatus at least to:

detect that a user equipment, which is already connected to a first radio access technology, is also connecting with the second radio access technology while maintaining connection with the first radio access technology, wherein the first and second radio access technologies are different cellular radio access technologies; and receive an indication, from the user equipment or from the first radio access technology, that the connection with the user equipment will be a dual-radio access technology connection, and that the second radio access technology is one of a master or slave radio access technology for the connection, wherein the slave radio access technology has restricted mobility management functionality compared to the master radio access technology such that the master radio access technology is in control of the inter-radio access technology mobility of the user equipment and in control of mobility of the user equipment within the master radio access technology and the slave radio access technology controls mobility of the user equipment only within the slave radio access technology, such that the slave radio access technology controls user equipment handovers only between cells of the slave radio access technology.

13. The apparatus according to claim 12, wherein the at least one memory and computer program code are configured, with the at least one processor, to cause the apparatus further to:

receive an indication according to which the second radio access technology is to switch a role from the slave radio access technology to the master radio access technology, or vice versa.

* * * * *